(12) United States Patent
Hosokai et al.

(10) Patent No.: US 11,815,961 B2
(45) Date of Patent: Nov. 14, 2023

(54) PORTABLE INFORMATION DEVICE AND COVER DEVICE

(71) Applicant: Lenovo (Singapore) Pte. Ltd., Singapore (SG)

(72) Inventors: Tatsuya Hosokai, Kanagawa (JP); Tatsuya Ushioda, Kanagawa (JP); Hiroaki Kinoshita, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 221 days.

(21) Appl. No.: 17/354,340

(22) Filed: Jun. 22, 2021

(65) Prior Publication Data

US 2022/0026957 A1    Jan. 27, 2022

(30) Foreign Application Priority Data

Jul. 21, 2020 (JP) .................. 2020-124421

(51) Int. Cl.
*G06F 1/16* (2006.01)
*G06F 1/20* (2006.01)

(52) U.S. Cl.
CPC .......... *G06F 1/1656* (2013.01); *G06F 1/1616* (2013.01); *G06F 1/203* (2013.01); *G06F 2200/1633* (2013.01)

(58) Field of Classification Search
CPC .... G06F 1/1681; G06F 1/1652; G06F 1/1615; G06F 1/1616
See application file for complete search history.

(56) References Cited

U.S. PATENT DOCUMENTS

| | | | |
|---|---|---|---|
| 9,225,377 B1 * | 12/2015 | Hart | H04B 1/3888 |
| 9,348,450 B1 * | 5/2016 | Kim | H04M 1/0268 |
| 2017/0199549 A1 * | 7/2017 | Yeom | G06F 1/1652 |
| 2020/0128687 A1 * | 4/2020 | Ku | G06F 1/1681 |
| 2020/0150727 A1 * | 5/2020 | Ho | B29C 66/7292 |
| 2021/0356998 A1 * | 11/2021 | Park | H04M 1/0268 |
| 2022/0270522 A1 * | 8/2022 | Afsar | G09F 9/33 |

FOREIGN PATENT DOCUMENTS

| | | |
|---|---|---|
| JP | 2000-010661 A | 1/2000 |
| JP | 2012-079809 A | 4/2012 |
| JP | 2017-184128 A | 10/2017 |

* cited by examiner

*Primary Examiner* — Anthony Q Edwards
(74) *Attorney, Agent, or Firm* — Osha Bergman Watanabe & Burton LLP

(57) ABSTRACT

A portable information device includes a chassis with a heating element housed inside, and a cover device which covers the back surface of the chassis. The cover device has a core material, a graphite sheet laminated on the surface of the core material, an auxiliary sheet laminated on the surface of the graphite sheet and softer than the core material, and a surface material laminated on the surface of the auxiliary sheet to form the surface of the cover device and softer than the auxiliary sheet.

11 Claims, 9 Drawing Sheets

PORTABLE INFORMATION DEVICE AND COVER DEVICE

CROSS-REFERENCE TO RELATED APPLICATIONS

This application claims priority to Japanese Patent Application No. 2020-124421 filed on Jul. 21, 2020. The entire disclosure of this application is incorporated herein by reference.

TECHNICAL FIELD

The present invention relates to a portable information device having a cover device and the cover device.

BACKGROUND

A portable information device such as a laptop PC or a tablet PC is required to avoid damage or breakage when being carried around. Further, it is desired that the appearance design and the sense of touch of the portable information device should be of high quality. Therefore, a cover device may be mounted on the back surface of the chassis of the portable information device for the purpose of protection or decoration.

Thus, the cover device may be mounted to cover the back surface of the chassis for the purpose of protection or decoration of the portable information device (for example, see Japanese Unexamined Patent Application Publication No. 2000-10661).

In the meantime, when the cover device is mounted on the back surface of the chassis, since heat dissipation from the chassis is restricted to make the internal temperature high, there is a concern that the performance of the portable information device such as processing speed may be reduced. Further, when a local hot area is formed in part of the cover device, a user gets uncomfortable. Therefore, the cover device in Japanese Unexamined Patent Application Publication No. 2000-10661 has a graphite sheet provided inside of a leather external skin as a surface material so that heat generated from the chassis can be diffused by this graphite sheet.

However, the graphite sheet cannot completely prevent the formation of an uneven shape due to bubbles or wrinkles at the time of manufacture. Therefore, in the cover device of Japanese Unexamined Patent Application Publication No. 2000-10661, the uneven shape on the graphite sheet may be transferred to the surface material formed of soft leather or the like. This causes an uneven shape on the surface material, and deteriorates quality in appearance and the sense of touch.

SUMMARY OF THE INVENTION

One or more embodiments provide a portable information device having a cover device capable of preventing quality deterioration in appearance and the sense of touch while ensuring heat dissipation performance, and the cover device.

A portable information device according to one aspect is a portable information device including: a chassis with a heating element housed inside; and a cover device which covers the back surface of the chassis, wherein the cover device has a core material, a graphite sheet laminated on the surface of the core material, an auxiliary sheet laminated on the surface of the graphite sheet and softer than the core material, and a surface material laminated on the surface of the auxiliary sheet to form the surface of the cover device and softer than the auxiliary sheet.

The above portable information device may also be such that the auxiliary sheet covers the entire surface of the graphite sheet.

The above portable information device may further be such that the core material and the auxiliary sheet are made of resin, and the thickness of the auxiliary sheet is less than the thickness of the core material.

Further, the above portable information device may be such that the chassis has a first chassis and a second chassis coupled adjacent to the first chassis to be rotatable relative to the first chassis, wherein the cover device has a slide cover section provided to be movable relative to the back surface of the first chassis along a line-up direction of the first chassis and the second chassis, a fixed cover section relatively fixed to the back surface of the second chassis, and a folding cover section which connects between the slide cover section and the fixed cover section to be rotatable relative to each other, the core material is provided in the slide cover section and the fixed cover section but is not provided in the folding cover section, and the graphite sheet, the auxiliary sheet, and the surface material extend over the slide cover section, the folding cover section, and the fixed cover section, and the folding cover section has a foldable folding region.

Further, the above portable information device may be such that the fixed cover section is provided to cover part of the back surface of the second chassis, and the cover device further has a stand cover section provided adjacent to the fixed cover section to cover the back surface of the second chassis, and provided to be rotatable relative to the fixed cover section.

Further, the above portable information device may be such that the heating element includes a central processing unit, and the central processing unit is installed in the first chassis.

The above portable information device may further include a slider device which couples the slide cover section to the first chassis to be movable relative to the first chassis along the line-up direction, wherein the slider device has a rail fixed to one of the slide cover section and the first chassis to extend along the line-up direction, and a slider fixed to the other of the slide cover section and the first chassis, and coupled to the rail to be slidable along the line-up direction, and the slider device is placed in a position not overlapping the central processing unit.

A cover device according to another aspect is a cover device configured to cover the back surface of a chassis of a portable information device, including: a core material; a graphite sheet placed on the surface of the core material; an auxiliary sheet laminated on the surface of the graphite sheet and softer than the core material; and a surface material laminated on the surface of the auxiliary sheet to form the surface of the cover device and softer than the auxiliary sheet.

The above cover device may also be such that the auxiliary sheet covers the entire surface of the graphite sheet.

The above cover device may further be such that the cover device has a first cover section, a second cover section, and a folding cover section which connects between the first cover section and the second cover section to be rotatable relative to each other, the core material is provided in the first cover section and the second cover section, but is not provided in the folding cover section, and the graphite sheet, the auxiliary sheet, and the surface material extend over the first cover section, the folding cover section, and the second cover section, and the folding cover section has a foldable folding region.

One or more embodiments of the present invention can prevent quality deterioration in appearance and the sense of touch while ensuring heat dissipation performance.

DETAILED DESCRIPTION

A portable information device and a cover device according to embodiments of the present invention will be described in detail below with reference to the accompanying drawings by taking a preferred embodiment.

Figure 1:
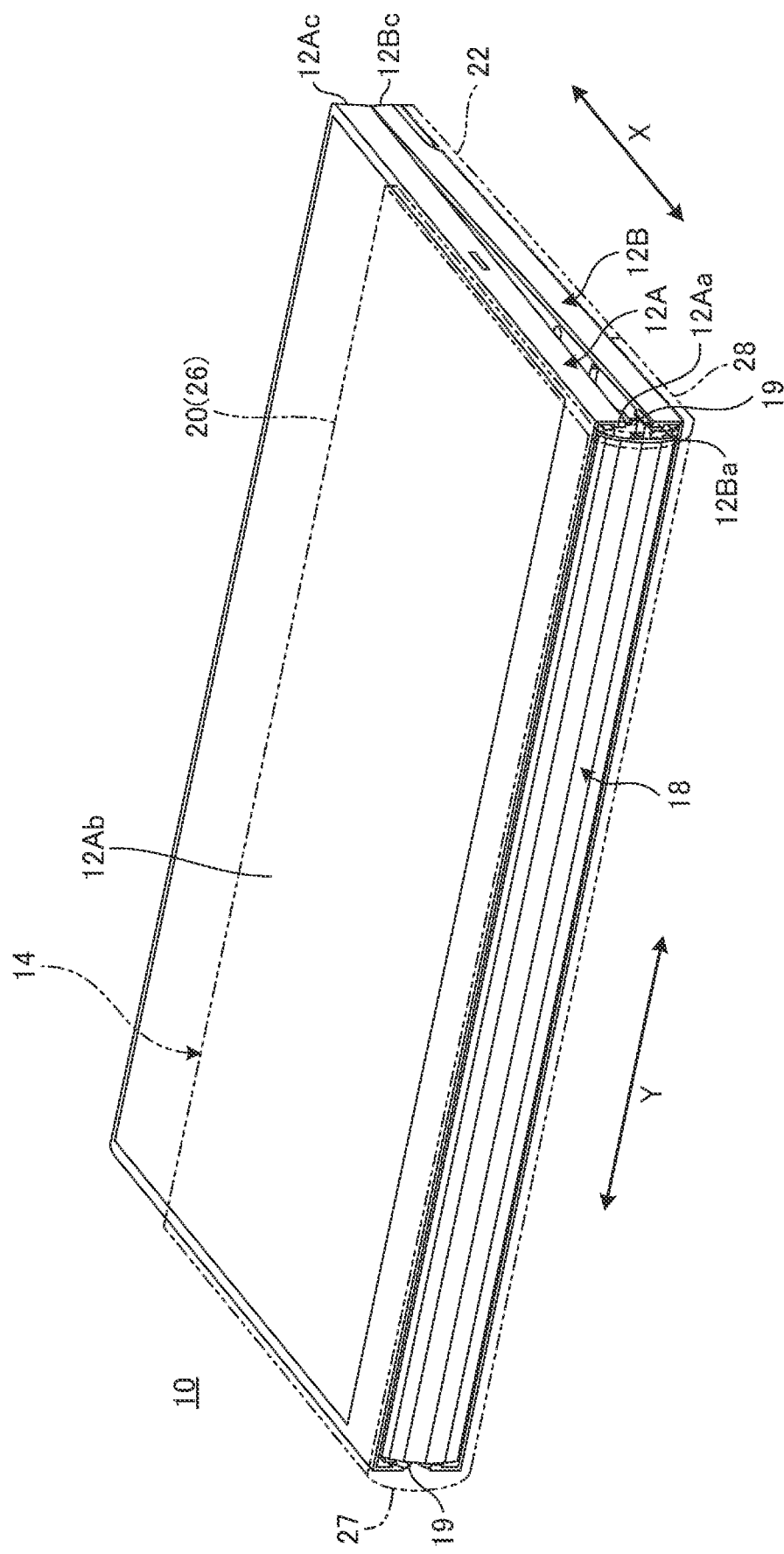
FIG. 1 is a perspective view illustrating a state where a portable information device according to one embodiment is closed and shaped into a folded form.
Figure 2A:
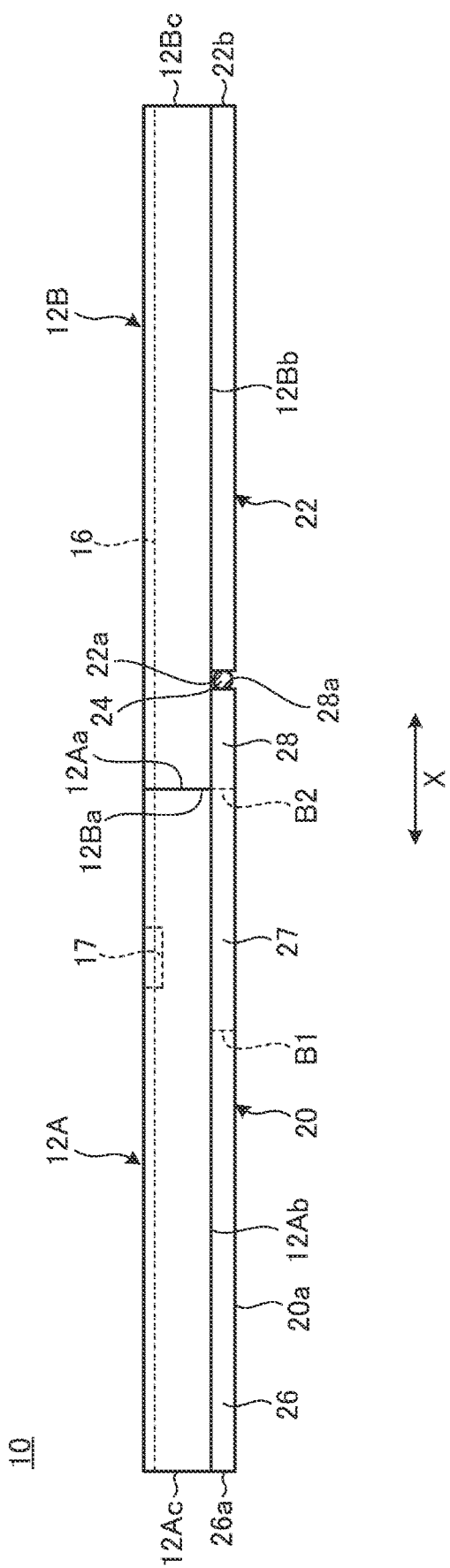
FIG. 2A is a side view schematically illustrating a state where the portable information device illustrated in FIG. 1 is opened and shaped into a flat plate form.
Figure 2B:
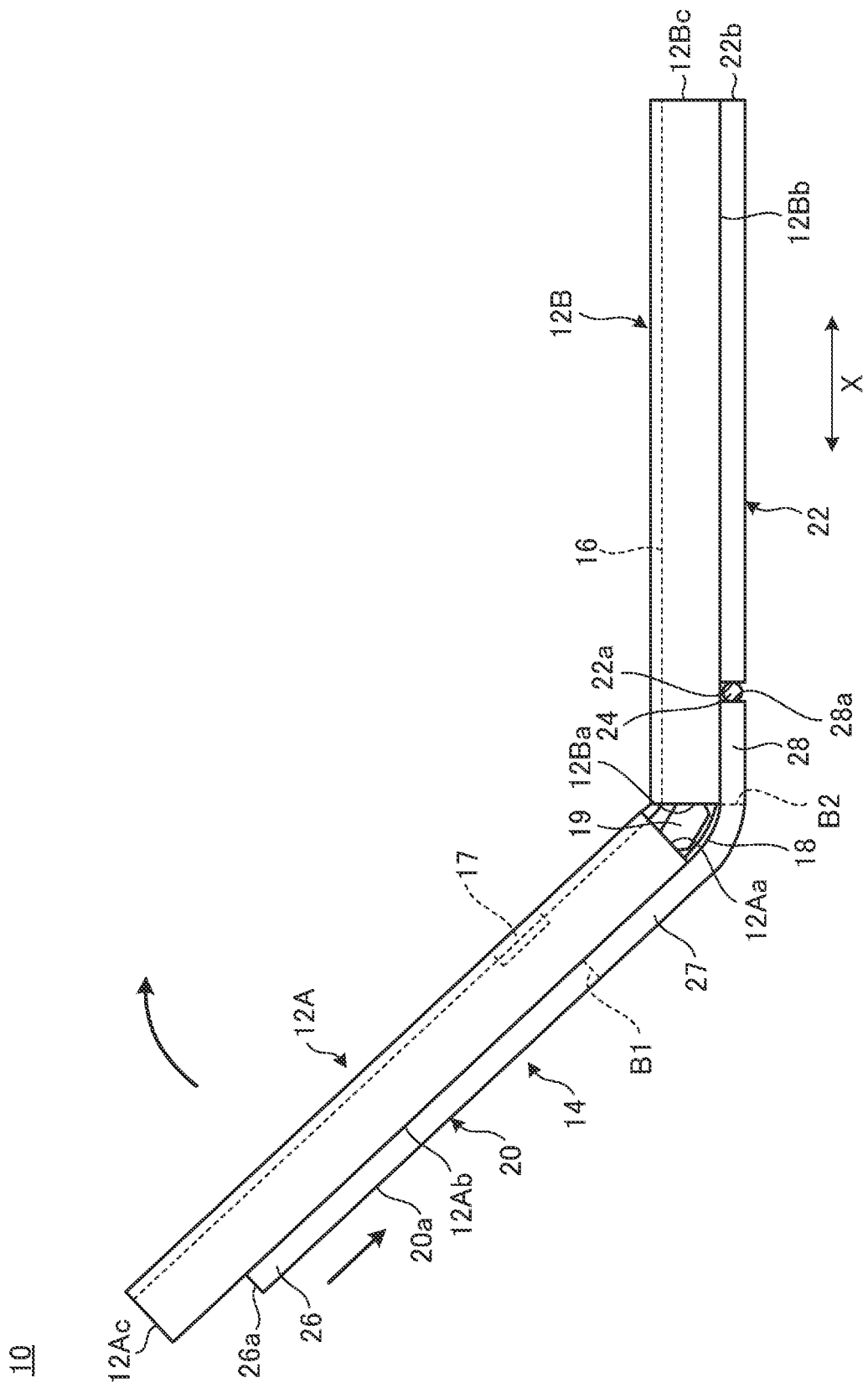
FIG. 2B is a side view in a state where the portable information device illustrated in FIG. 2A is shaped into a laptop form.
Figure 2C:
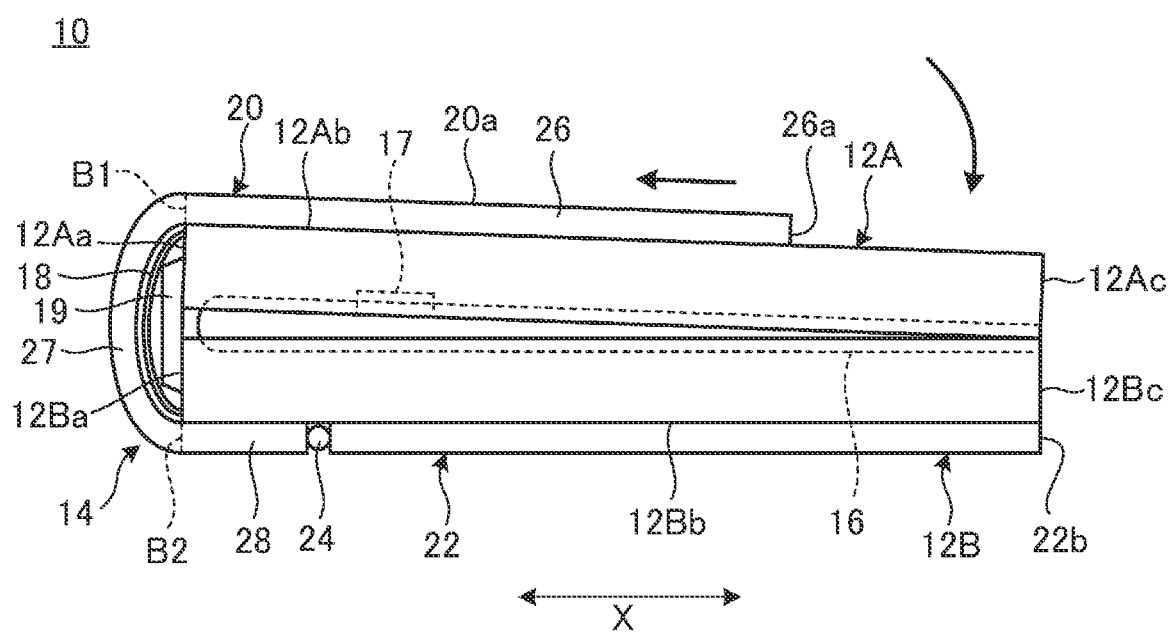
FIG. 2C is a side view in a state where the portable information device illustrated in FIG. 2B is closed and shaped into the folded form.

FIG. 1 is a perspective view illustrating a state where a portable information device 10 according to one embodiment is closed and shaped into a folded form. FIG. 2A is a side view schematically illustrating a state where the portable information device 10 illustrated in FIG. 1 is opened and shaped into a flat plate form. FIG. 2B is a side view in a state where the portable information device 10 illustrated in FIG. 2A is shaped into a laptop form. FIG. 2C is a side view in a state where the portable information device 10 illustrated in FIG. 2B is closed and shaped into the folded form.

As illustrated in FIGS. 1 to 2C, the portable information device 10 includes a first chassis 12A, a second chassis 12B, and a cover device 14. The portable information device 10 of the embodiment is a foldable tablet PC or laptop PC. The cover device 14 has a protection function to cover the outer surfaces of the chassis 12A and 12B in order to protect the chassis 12A and 12B, and a decoration function to decorate the outer surfaces in order to enhance the appearance design. The portable information device on which the cover device 14 is mounted may also be a common clamshell laptop PC, a single plate-shaped tablet PC, a smartphone, a portable game machine, or the like, as well as the portable information device 10.

First, the structure of the portable information device 10 will be described. The portable information device 10 includes the chassis 12A, 12B and a display 16.

The chassis 12A and 12B are placed adjacent to each other. Adjacent edges 12Aa and 12Ba of the chassis 12A and 12B are covered internally with a spine member 18. Each of the chassis 12A and 12B is formed into a rectangular, plate-shaped member with side walls standing on three sides except the adjacent edge 12Aa, 12Ba, respectively. The chassis 12A, 12B is formed from a metal plate made of stainless steel, magnesium steel, aluminum steel, or the like, or formed from a fiber-reinforced plastic plate containing reinforcing fiber such as carbon fiber.

The portable information device 10 as illustrated in FIG. 1 to FIG. 2C will be described below by expressing a line-up direction of the chassis 12A, 12B as an X direction and a direction orthogonal to the line-up direction along the adjacent edges 12Aa, 12Ba as a Y direction.

The adjacent edges 12Aa and 12Ba of the chassis 12A and 12B are coupled to each other through a pair of hinges 19, 19. The chassis 12A and 12B are coupled by the hinges 19 to be rotatable relative to each other between the flat plate form illustrated in FIG. 2A and the folded form illustrated in FIG. 2C. The hinges 19 can generate a predetermined rotation torque. Therefore, the chassis 12A and 12B are stabilized even in the laptop form (see FIG. 2B) in which the angle between the chassis 12A and 12B is about 90° to 140°. For example, the hinges 19 are disposed in both end portions of the adjacent edges 12Aa and 12Ba of the chassis 12A and 12B in the Y direction, and located outside of an outer peripheral edge of the display 16, respectively. The portable information device 10 of the embodiment is so set that the rotation center between the chassis 12A and 12B by the hinges 19 matches the surface of the display 16.

Figure 7:
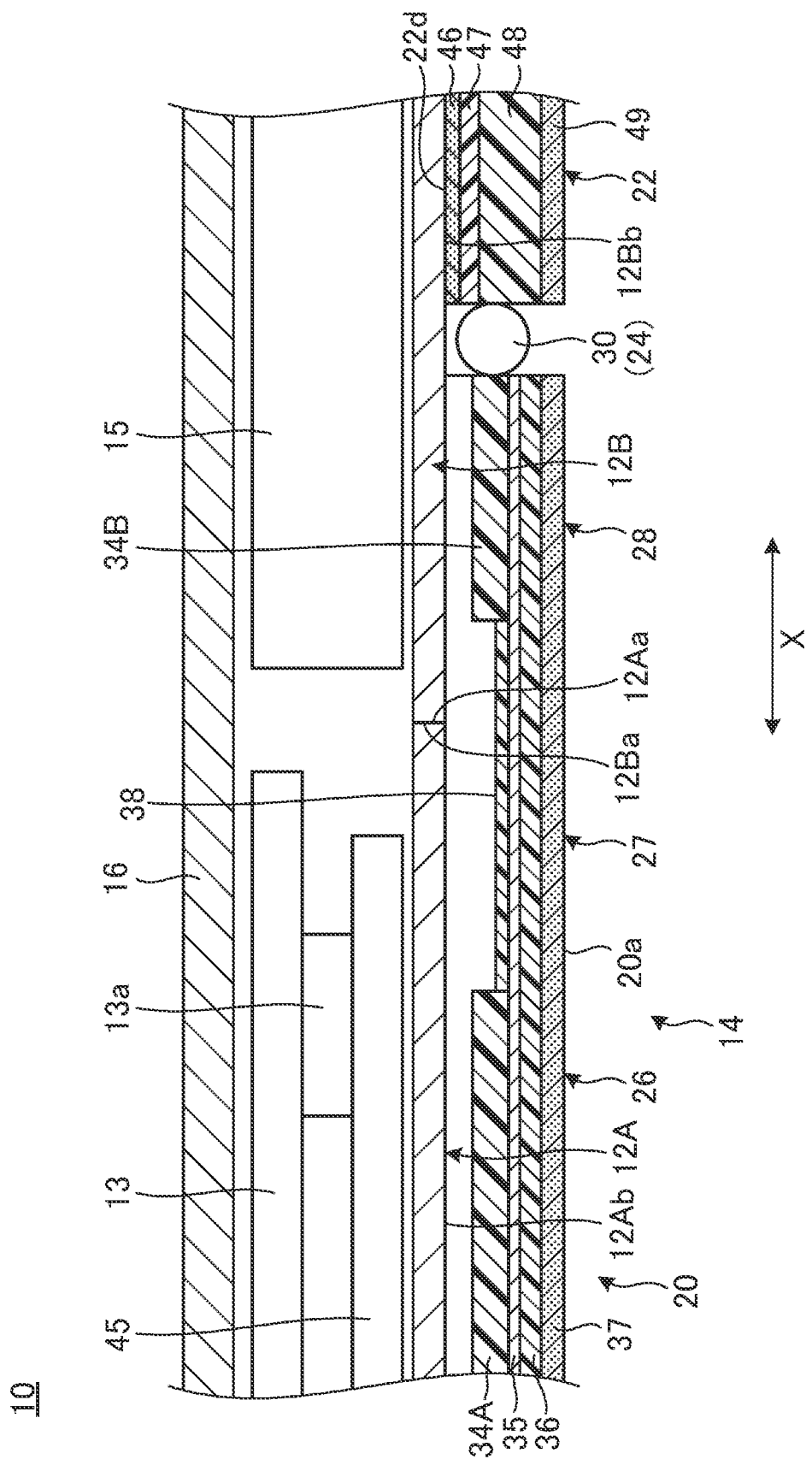
FIG. 7 is a schematic sectional view taken along line VII-VII in FIG. 3.

In the first chassis 12A, a substrate 13 on which a CPU (Central Processing Unit) 13a is mounted, and unillustrated electronic components such as a power supply circuit are housed (see FIG. 7). In the second chassis 12B, a battery device 15 and other electronic components are housed (see FIG. 7). The CPU 13a is the highest heating element among the electronic components mounted in the portable information device 10. The power supply circuit is the second highest heating element next to the CPU 13a. The battery device 15 is smaller in heat dissipation than the CPU 13a and the power supply circuit. Therefore, in the portable information device 10, the left and right chassis 12A and 12B are different in heat dissipation, that is, the first chassis 12A becomes hotter than the second chassis 12B. Reference numeral 17 in FIG. 2A to FIG. 2C denotes an imaging camera facing from an opening formed in a bezel surrounding the display 16 on the surface of the first chassis 12A.

The display 16 is, for example, a touch panel liquid crystal display. A band-shaped range of the display 16 extending in the Y direction across the adjacent edges 12Aa and 12Ba is a folding region. Thus, the display 16 is foldable together when the chassis 12A and 12B are folded, and opened and closed along with the opening/closing operation of the chassis 12A and 12B. The display 16 is, for example, a flexible display such as organic EL (Electro Luminescence) having a highly flexible paper structure or the like.

Figure 3:
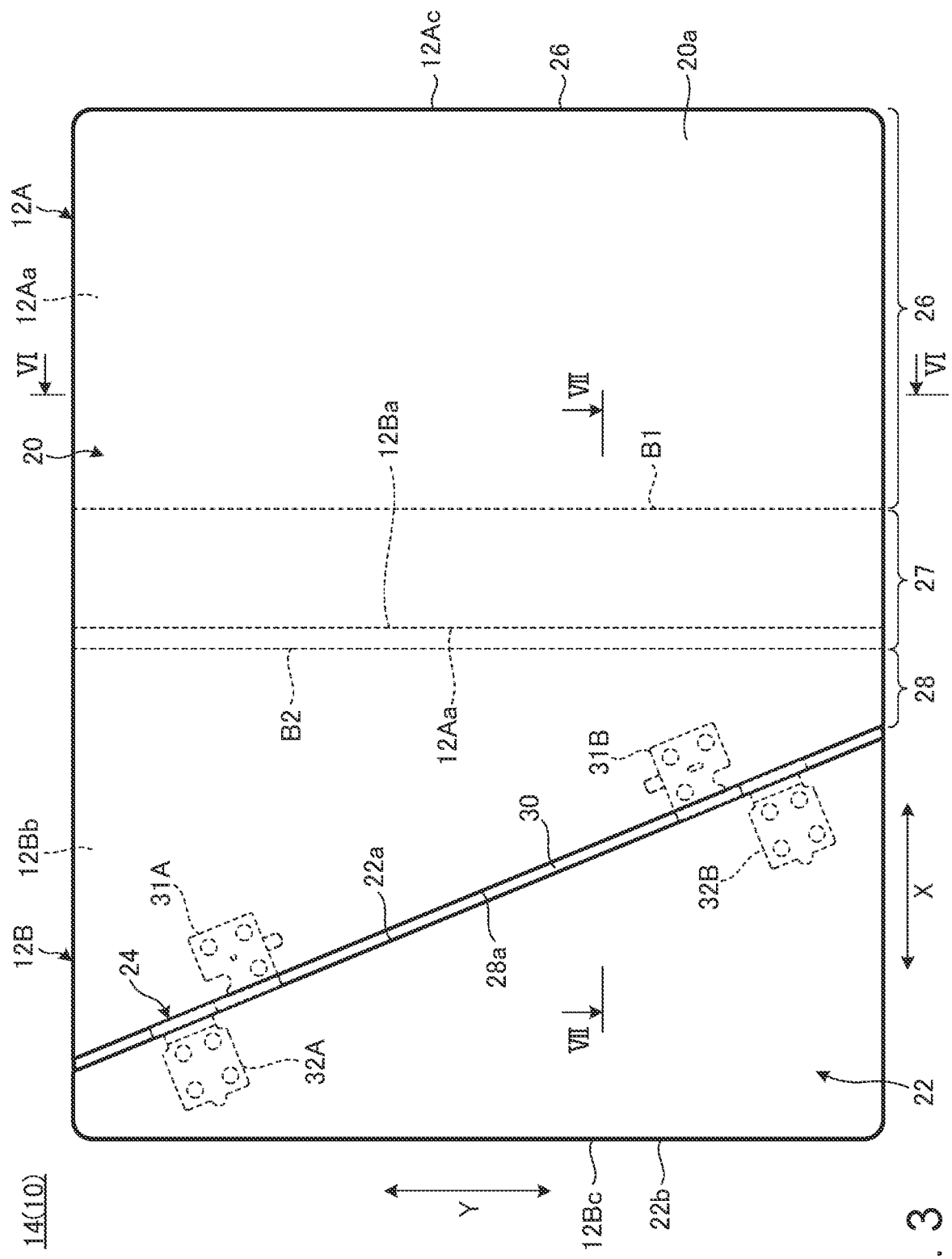
FIG. 3 is a plan view of the portable information device as viewed from the side of a cover device.

The overall structure of the cover device 14 will next be described. FIG. 3 is a plan view of the portable information device 10 as viewed from the side of the cover device 14.

As illustrated in FIG. 1 to FIG. 3, the cover device 14 is provided to cover the back surfaces 12Ab and 12Bb of the chassis 12A and 12B. In the flat plate form (see FIG. 2A), the cover device 14 covers the entire back surfaces 12Ab and 12Bb. In the laptop form and the folded form (see FIG. 2B and FIG. 2C), the cover device 14 covers most of the back surface 12Ab and the entire back surface 12Bb.

The cover device 14 includes a base cover section 20, a stand cover section 22, and a hinge device 24. The cover sections 20 and 22 extend in the X direction across the hinge device 24. In the flat plate form, the cover sections 20 and 22 cover the entire back surfaces 12Ab and 12Bb as a whole, that is, cover the chassis 12A and 12B from an open edge 12Ac of the first chassis 12A to an open edge 12Bc of the second chassis 12B. The open edges 12Ac and 12Bc are edges located on the other side of the adjacent edges 12Aa and 12Ba in the X direction to extend in the Y direction, respectively.

The base cover section 20 has a slide cover section 26, a folding cover section 27, and a fixed cover section 28 in this order from the side of the first chassis 12A toward the side of the second chassis 12B.

The slide cover section 26 is a thin plate-shaped member provided to be movable in the X direction relative to the back surface 12Ab of the first chassis 12A. In the flat plate form illustrated in FIG. 2A and FIG. 3, a distal edge 26a of the slide cover section 26 matches the open edge 12Ac of the first chassis 12A. The distal edge 26a is located on the other side of a border line B1 with the folding cover section 27 in the X direction, which is an edge extending in the Y direction. In the laptop form and the folded form illustrated in FIG. 2B and FIG. 2C, the slide cover section 26 is slid to a position where the distal edge 26a is retreated from the open edge 12Ac to the side of the adjacent edge 12Aa, respectively.

The folding cover section 27 is provided in a position between the chassis 12A and 12B across the adjacent edges 12Aa and 12Ba, which is a band-shaped region narrow in the X direction and extending in the Y direction. The folding cover section 27 is connected to the slide cover section 26 to be foldable on the border line B1 along the Y direction on the side of the first chassis 12A. Then, the folding cover section 27 is connected to the fixed cover section 28 to be foldable on a border line B2 along the Y direction on the side of the second chassis 12B. The folding cover section 27 has flexibility as a whole to connect between the first cover section 26 and the fixed cover section 28 to be rotatable relative to each other. The folding cover section 27 is a flexible hinge to rotate the cover device 14 following the rotational operation between the chassis 12A and 12B. The folding cover section 27 is a folding region having a width dimension in the X direction to be able to cover the adjacent edges 12Aa and 12Ba of the chassis 12A and 12B at least in the folded form illustrated in FIG. 2C.

The fixed cover section 28 is a thin plate-shaped member to cover the back surface 12Bb of the second chassis 12B together with part of the folding cover section 27 and the stand cover section 22. The fixed cover section 28 is formed into a shape substantially line-symmetric with respect to the stand cover section 22, which is a substantially trapezoidal shape in plan view in the embodiment. The fixed cover section 28 is fixed relative to the back surface 12Bb of the second chassis 12B. The fixed cover section 28 of the embodiment is fixed directly to the back surface 12Bb. An edge 28a of the fixed cover section 28 on the other side of the border line B2 in the X direction is adjacent to the stand cover section 22 through the hinge device 24. The edge 28a is inclined in the X direction gradually toward the Y direction.

Figure 4:
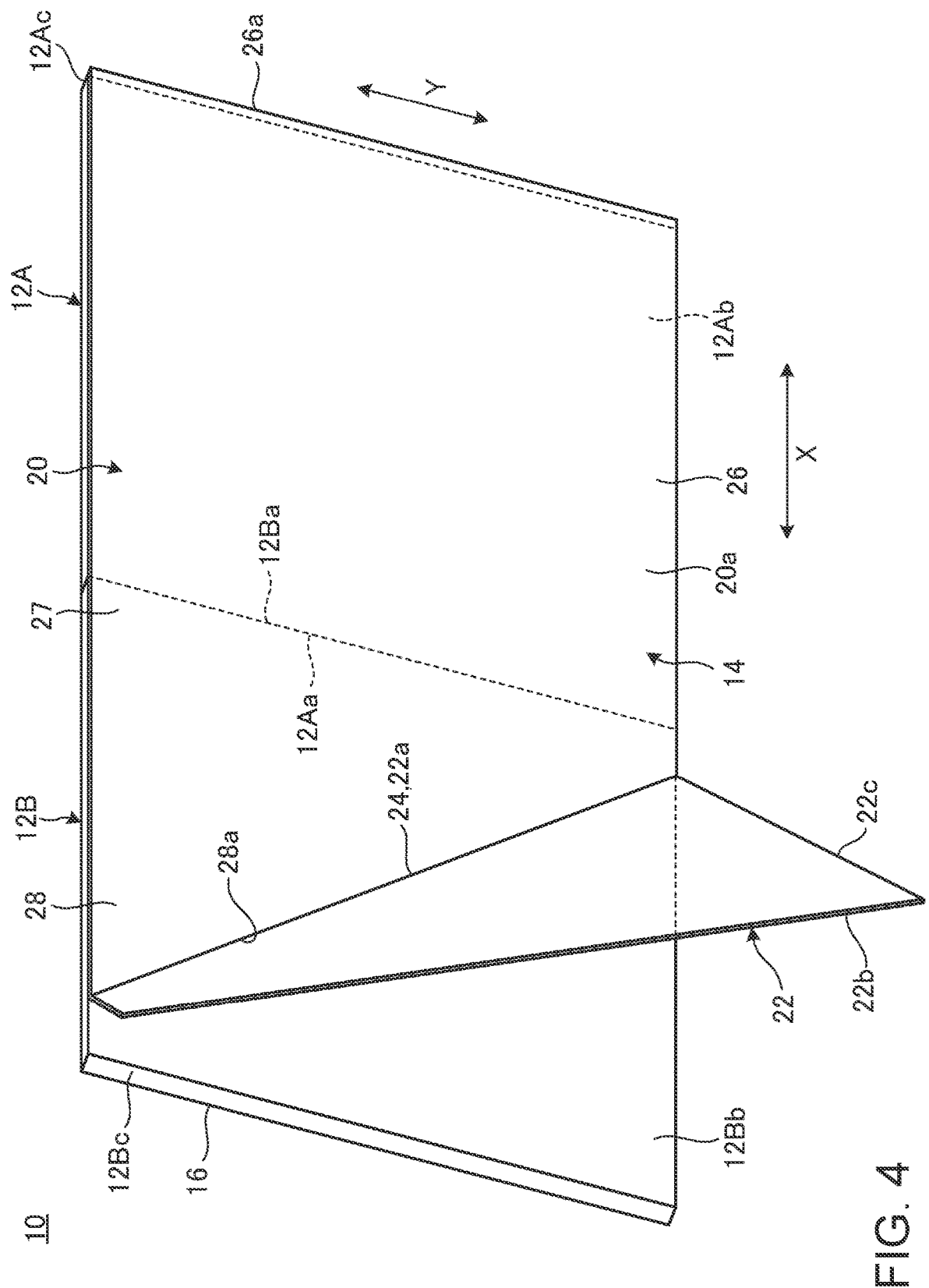
FIG. 4 is a schematic perspective view in a state where a stand cover section is set to a standing position to make the portable information device stand up.

FIG. 4 is a schematic perspective view in a state where the stand cover section 22 is set to a standing position to make the portable information device 10 stand up. As illustrated in FIG. 4, the stand cover section 22 is provided to be rotatable relative to the fixed cover section 28 of the base cover section 20 and the back surface 12Bb of the second chassis 12B. The stand cover section 22 of the embodiment is coupled to the back surface 12Bb of the second chassis 12B through the hinge device 24.

As illustrated in FIG. 2A to FIG. 4, the stand cover section 22 is formed into a shape substantially line-symmetric with respect to the fixed cover section 28, which is a substantially trapezoidal shape in plan view in the embodiment. The stand cover section 22 is so provided that an edge 22a adjacent to the edge 28a of the fixed cover section 28 across the hinge device 24 is coupled to the hinge device 24. A distal edge 22b of the stand cover section 22 on the other side of the edge 22a matches the open edge 12Bc of the second chassis 12B.

By rotational operation of the hinge device 24, the stand cover section 22 can move from a stored position (0°) where the distal edge 22b abuts against the back surface 12Bb in a direction away gradually from the back surface 12Bb. The distal edge 22b can move up to a position (180°) at which the distal edge 22b abuts against a surface 20a of the base cover section 20 and further movement is restricted. Thus, the stand cover section 22 can move between the stored position (see FIG. 2A and FIG. 3) where the stand cover section 22 is provided along the back surface 12Bb, and the standing position (for example, see FIG. 4) where the stand cover section 22 protrudes from the back surface 12Bb.

As illustrated in FIG. 4, the stand cover section 22 is set to a proper angle (standing position) with respect to the fixed cover section 28 to function as a stand to keep the portable information device 10 in the flat plate form in a standing posture. In the standing position of the stand cover section 22, a bottom edge 22c as a trapezoidal bottom abuts on a desk surface or the like so that the portable information device 10 can be kept in a predetermined standing posture fallen a little on the side of the back surfaces 12Ab and 12Bb.

The hinge device 24 couples the stand cover section 22 to be rotatable relative to the base cover section 20 and the second chassis 12B. As illustrated in FIG. 3, the hinge device 24 includes a hinge shaft 30, first brackets 31A and 31B, and second brackets 32A, 32B.

The hinge shaft 30 is a metal rod-shaped member that intervenes between the edge 22a of the stand cover section 22 and the edge 28a of the fixed cover section 28 to extend along these edges 22a and 28a. The first brackets 31A and 31B are screwed on the second chassis 12B. The second brackets 32A and 32B are fixed to the stand cover section 22. Since the first brackets 31A, 31B or the second brackets 32A, 32B in the hinge device 24 are supported rotatably through a predetermined rotational torque with respect to the hinge shaft 30, the first brackets 31A, 31B and the second brackets 32A, 32B are rotated relative to each other. Thus, the hinge device 24 supports the stand cover section 22 to be rotatable relative to the second chassis 12B and the fixed cover section 28. As a result, the stand cover section 22 can be kept in the standing position with a desired angle, thus functioning as a kickstand of the portable information device 10 (see FIG. 4).

Figure 5:
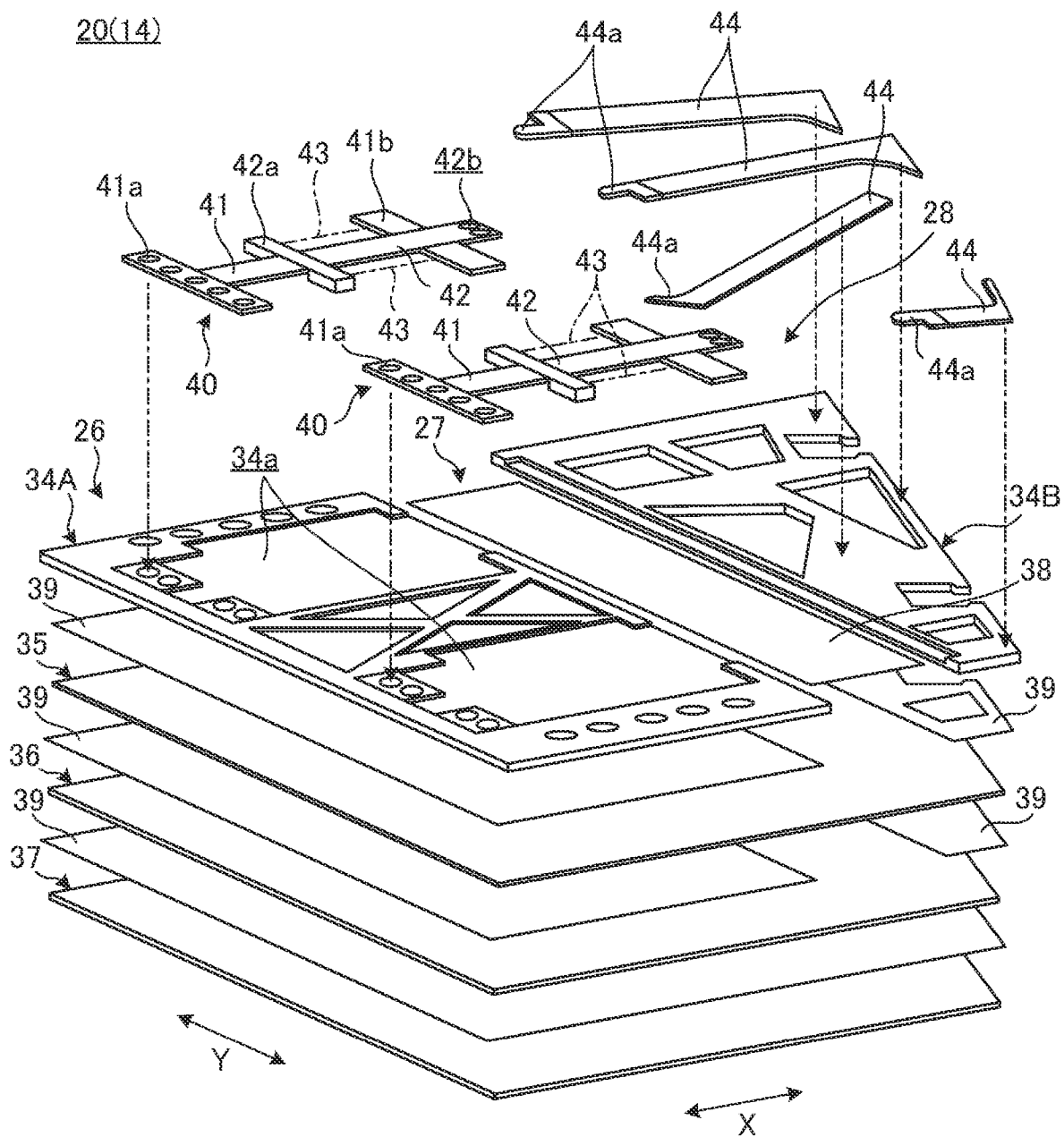
FIG. 5 is an exploded perspective view of a base cover section.
Figure 6:
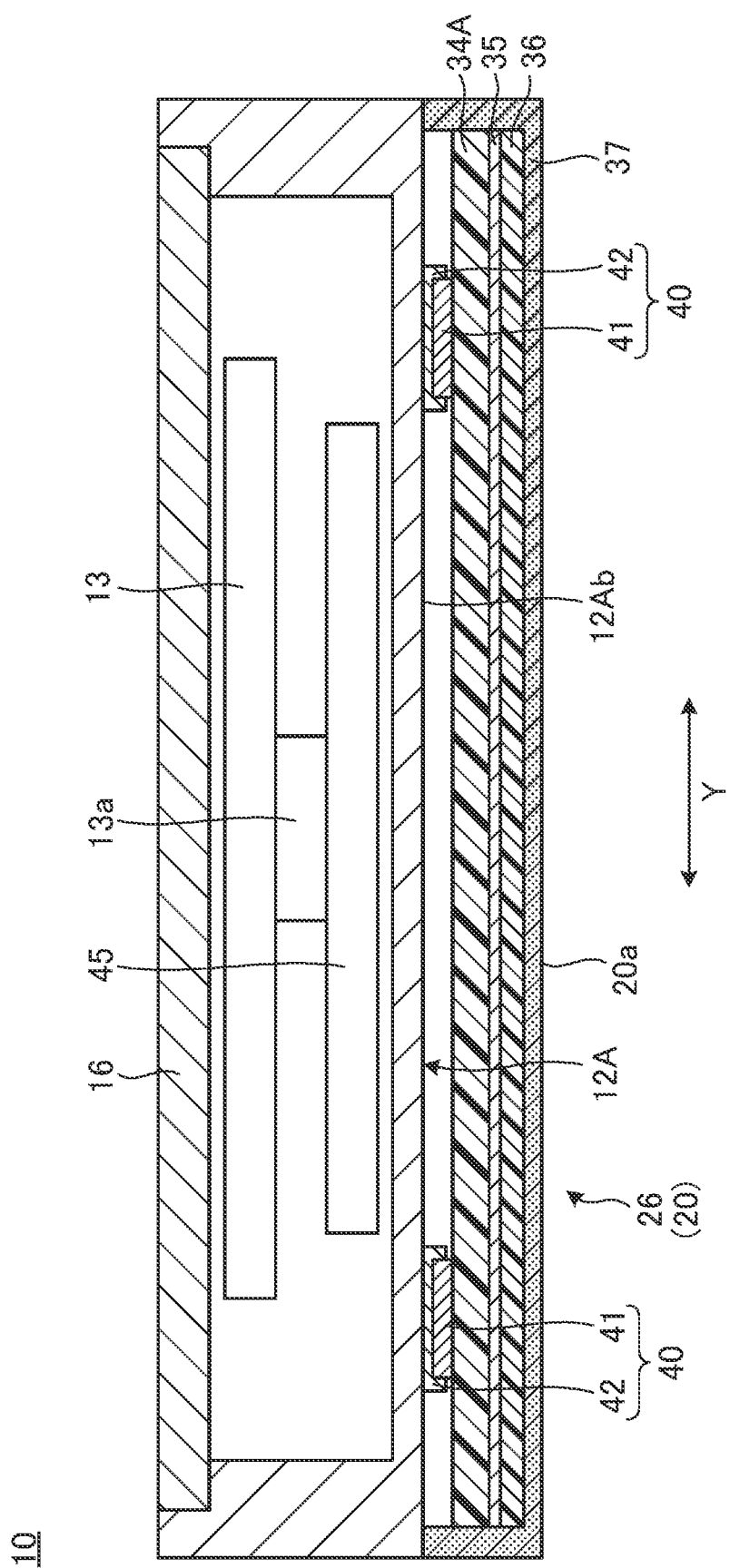
FIG. 6 is a schematic sectional view taken along line VI-VI in FIG. 3.

Next, a specific internal structure of the cover device 14 will be described. FIG. 5 is an exploded perspective view of the base cover section 20. FIG. 6 is a schematic sectional view taken along line VI-VI in FIG. 3. FIG. 7 is a schematic sectional view taken along line VII-VII in FIG. 3.

As illustrated in FIG. 5 to FIG. 7, in the base cover section 20, the slide cover section 26 has a structure in which a core material 34A, a graphite sheet 35, an auxiliary sheet 36, and a surface material 37 are laminated in this order from the side of the back surface 12Ab of the first chassis 12A. The fixed cover section 28 has a structure in which a core material 34B, the graphite sheet 35, the auxiliary sheet 36, and the surface material 37 are laminated in this order from the side of the back surface 12Bb of the second chassis 12B. The folding cover section 27 has a structure in which a protective cover 38, the graphite sheet 35, the auxiliary sheet 36, and the surface material 37 are laminated in this order from the side of the back surface 12AB, 12Bb of the chassis 12A, 12B. Reference numeral 39 in FIG. 5 denotes a fixing member such as double-sided tape or adhesive. The laminated structure of the base cover section 20 or the stand cover section 22 to be described later can be changed as appropriate, and the number of laminated layers and the order of laminations can also be changed as appropriate.

The core material 34A is a hard member as the base of the slide cover section 26. The core material 34A extends substantially over the entire surface of the slide cover section 26, and recesses and cutout portions are formed in various places for part placement, weight saving, and the like. The core material 34A is a plate-shaped member molded with resin, such as glass fiber reinforced plastic (GFRP) formed by impregnating glass fiber with epoxy resin or polycarbonate (PC). For example, the core material 34A has a plate thickness of about 1 to 2 mm.

The core material 34B is a hard member as the base of the fixed cover section 28. The core material 34B extends substantially over the entire surface of the fixed cover section 28, and notched portions and cutouts are formed in various places for weight saving. The core material 34B may be of the same material and plate thickness as the core material 34A of the slide cover section 26 except that the shape is different from the core material 34A.

The slide cover section 26 is supported by a pair of slide mechanisms 40, lined up with a space therebetween in the Y direction, to be movable relative to the first chassis 12A in the X direction. Each slide mechanism 40 is arranged in each of large recesses 34a formed on the back surface of the core material 34A, respectively. Each slide mechanism 40 is placed in a position not overlapping the CPU 13a (see FIG. 6). The slide mechanism 40 has a rail 41 and a slider 42.

The rail 41 is a thin metal plate extending in the X direction. Mounting plates 41a and 41b are provided in end portions of the rail 41 in the longitudinal direction. Each of the mounting plates 41a and 41b of the rail 41 is fixed to the core material 34A in the recess 34a by using screws, adhesive, or the like. The slider 42 is coupled to the rail 41 to be slidable in the X direction. The slider 42 has a slider blade 42a in one end portion on the side of the mounting plate 41a, and a pair of mounting holes 42b, 42b in the other end portion on the side of the mounting plate 41b. The slider blade 42a is coupled to the rail 41 to be slidable in the X direction. The slider blade 42a is locked with a hook protruding from the second chassis 12B to be immovable in a direction from the second chassis 12B toward the first chassis 12A. Each mounting hole 42b is screwed to the first chassis 12A. Springs 43 are provided between facing surfaces of the slider blade 42a and the mounting plate 41b.

The springs 43 are tension coil springs. The springs 43 always urge the slider 42 toward the rail 41 in a direction in which the slider blade 42a is separated from the mounting plate 41b. Thus, the slide mechanism 40 causes the distal edge 26a of the slide cover section 26 to always urge the slide cover section 26 in a slide direction toward the open edge 12Ac of the first chassis 12A.

In the fixed cover section 28, the core material 34B is fixed to the back surface 12Bb of the second chassis 12B by using plural pieces of double-sided adhesive tape 44 (four pieces in FIG. 5). Each piece of double-sided adhesive tape 44 has a tension peelable property. Each piece of double-sided adhesive tape 44 has a tab 44a for tension peeling operation at one end thereof. Each piece of double-sided adhesive tape 44 can be easily peeled off by pulling the tab 44a, and this makes the fixed cover section 28 easily removable from the second chassis 12B.

The graphite sheet 35 is fixed to and laminated on the surfaces of the core materials 34A and 34B by the fixing member 39. The graphite sheet 35 extends substantially over the entire surface of the base cover section 20. For example, the graphite sheet 35 has a thickness of about 0.05 to 0.15 mm. The graphite sheet 35 is a heat diffusion sheet which absorbs and diffuses heat generated inside the portable information device 10. The graphite sheet 35 suppresses the formation of a local hot area (hot spot) on the surface 20a of the base cover section 20.

The auxiliary sheet 36 is fixed to and laminated on the surface of the graphite sheet 35 by the fixing member 39. The auxiliary sheet 36 is provided to cover the entire surface of the graphite sheet 35 in order to prevent an uneven shape due to bubbles or wrinkles of the graphite sheet 35 from being transferred to the surface material 37. The auxiliary sheet 36 is softer than the core materials 34A and 34B and harder than the surface material 37. For example, the auxiliary sheet 36 is a sheet-shaped member molded with resin such as polycarbonate (PC). For example, the auxiliary sheet 36 has a thickness of about 0.1 to 0.5 mm.

The surface material 37 is an external covering material to enhance the appearance design and the sense of touch of the base cover section 20. The surface material 37 is fixed to and laminated on the surface of the auxiliary sheet 36 by the fixing member 39. The surface material 37 covers the entire surface of the auxiliary sheet 36 to form the surface 20a of the base cover section 20. The surface material 37 is formed of artificial leather, natural leather, resin, or the like, which is a sheet-shaped member softer than the auxiliary sheet 36 and the core materials 34A and 34B. For example, the surface material 37 has a thickness of about 0.5 to 1 mm.

As mentioned above, the folding cover section 27 is provided in a position as a gap between the core materials 34A and 34B without having the core materials 34A and 34B. The folding cover section 27 is formed only from the soft protective cover 38, the graphite sheet 35, the auxiliary sheet 36, and the surface material 37. The folding cover section 27 has flexibility as a flexible hinge because of having no core material. In other words, a folding region of the graphite sheet 35, the auxiliary sheet 36, and the surface material 37 forms the folding cover section 27. In the folding cover section 27, the protective cover 38 is pasted on the back surface of the graphite sheet 35 to cover the gap between the core materials 34A and 34B. The protective cover 38 is a sheet-shaped member to prevent graphite powder from spilling or the like. The protective cover 38 may be omitted. In this case, for example, the back surface of the graphite sheet 35 may be covered by resin coating or the like.

As illustrated in FIG. 6 and FIG. 7, a heat diffusion plate 45 is provided inside the first chassis 12A. The heat diffusion plate 45 is a plate made of metal with high thermal conductivity such as aluminum or copper. The heat diffusion plate 45 is thermally connected to the CPU 13a directly or through thermal rubber or the like. The heat diffusion plate 45 absorbs and diffuses heat generated by the CPU 13a. The heat diffusion plate 45 may also be provided to be able to absorb heat of any other heating element such as the power supply circuit in addition to the CPU 13a. The heat diffusion plate 45 is placed in contact with or in close proximity to the cover material that forms the back surface 12Ab of the first chassis 12A.

As illustrated in FIG. 7, the stand cover section 22 has a structure in which a back surface material 46, an auxiliary sheet 47, a core material 48, and a surface material 49 are laminated in this order from the side of the back surface 12Bb of the second chassis 12B.

The back surface material 46 is an external covering material to enhance the appearance design and the sense of touch of a back surface 22d of the stand cover section 22 that appears on the outside in the standing position. The back surface material 46 is fixed to and laminated on the back surface of the auxiliary sheet 47 by a fixing member similar to the fixing member 39. The back surface material 46 is a soft sheet-like member formed of artificial leather, natural leather, resin, or the like. For example, the back surface material 46 has a thickness of about 0.5 to 1 mm. Since the auxiliary sheet 47, the core material 48, and the surface material 49 are the same as or similar to the auxiliary sheet 36, the core material 34A, 34B, and the surface material 37 of the base cover section 20 mentioned above, the detailed description thereof will be omitted. The graphite sheet 35 and the auxiliary sheet 36 may also be provided in the stand cover section 22.

As illustrated in FIG. 7, the whole of the hinge shaft 30 in the hinge device 24 of the embodiment is located in a position lower than the surfaces of the surface materials 37 and 49 of the base cover section 20 and the stand cover section 22. Thus, since the hinge shaft 30, the bracket 31A, and the like do not protrude from the surface of the cover device 14 that forms the bottom of the second chassis 12B, a high appearance quality and a high sense of touch can be obtained. The hinge device 24 can suppress the amount of protrusion from the surface of the cover device 14 as long as at least the shaft center of the hinge shaft 30 is located in a position lower than the surfaces of the surface materials 37 and 49 of the base cover section 20 and the stand cover section 22.

As described above, the portable information device 10 of the embodiment includes the chassis 12A and 12B, and the cover device 14 that covers the back surfaces 12Ab and 12Bb of the chassis 12A and 12B. The cover device 14 has the core materials 34A and 34B, the graphite sheet 35 laminated on the surfaces of the core materials 34A and 34B, the auxiliary sheet 36 laminated on the surface of the graphite sheet 35 and softer than the core materials 34A and 34B, and the surface material 37 laminated on the surface of the auxiliary sheet 36 to form the surface of the cover device 14 and softer than the auxiliary sheet 36.

Thus, for example, the portable information device 10 can use artificial leather or the like as the soft surface material 37 to enhance the appearance design and the sense of touch of the portable information device 10. Moreover, heat released from the inside of the chassis 12A, 12B is absorbed and diffused by the graphite sheet 35. Therefore, although the portable information device 10 has such a structure that the cover device 14 is mounted on the back surfaces 12Ab and 12Bb, heat generated from inside can be dissipated efficiently. As a result, the portable information device 10 can suppress the inside of the chassis 12A, 12B from becoming hot, and hence can maintain high performance.

By the way, it is difficult to prevent the occurrence of an uneven shape due to bubbles or wrinkles of the graphite sheet 35 for convenience of manufacturing. Therefore, the cover device 14 is so formed that the auxiliary sheet 36 harder than the surface material 37 is sandwiched between the soft surface material 37 laminated on the graphite sheet 35 and the graphite sheet 35. Thus, in the cover device 14, the uneven shape of the graphite sheet 35 can be prevented by the auxiliary sheet 36 from being transferred to the surface material 37. As a result, the cover device 14 can prevent quality deterioration in appearance and the sense of touch while ensuring heat dissipation performance from the chassis 12A, 12B. Thus, although the auxiliary sheet 36 is required to cover most of the graphite sheet 35, it is preferred to cover the whole surface of the graphite sheet 35 particularly like in the embodiment.

The core materials 34A and 34B are made of resin such as formed with GFRP or PC. The auxiliary sheet 36 is, for example, made of resin formed with PC. In other words, since the core materials 34A and 34B are required to have high rigidity but be lightweight, the core materials 34A and 34B are formed as resin plates having some thickness. On the other hand, since the auxiliary sheet 36 is only required to prevent the uneven shape of the graphite sheet 35 from appearing on the surface material 37, the auxiliary sheet 36 is formed of a resin sheet thinner than the core materials 34A and 34B. In the embodiment, since there is a need to be able to form a soft folding region in the folding cover section 27, the auxiliary sheet 36 is also required to be a sufficiently thin sheet.

The portable information device 10 includes the two chassis 12A and 12B coupled to be rotatable relative to each other. The cover device 14 has the slide cover section 26 provided to be movable relative to the first chassis 12A along the X direction, the fixed cover section 28 fixed relative to the second chassis 12B, and the folding cover section 27 that connects between the slide cover section 26 and the fixed cover section 28 to be rotatable relative to each other. Here, the core material 34A is provided in the slide cover section 26, and the core material 34B is provided in the fixed cover section 28, but no core material is provided in the folding cover section 27. Further, the graphite sheet 35, the auxiliary sheet 36, and the surface material 37 extend over the slide cover section 26, the folding cover section 27, and the fixed cover section 28, and the folding cover section 27 has a foldable folding region. Note that the cover device 14 may also be structured not to have the stand cover section 22. In this case, the fixed cover section 28 has only to be spread to cover the whole of the back surface 12Bb of the second chassis 12B.

Therefore, although the portable information device 10 has such a structure that the chassis 12A and 12B are foldable, the cover device 14 can follow the rotational operation between chassis 12A and 12B while covering the whole of the back surfaces 12Ab and 12Bb. On this occasion, the auxiliary sheet 36 has the folding region in the folding cover section 27 together with the graphite sheet 35 and the surface material 37. Therefore, the auxiliary sheet 36 that prevents the uneven shape of the graphite sheet 35 from being transferred to the surface material 37 does not interfere with the folding operation of the folding cover section 27. The graphite sheet 35 and the auxiliary sheet 36 may also be provided only in the slide cover section 26.

The slide mechanisms 40 that support the slide cover section 26 with respect to the first chassis 12A is placed in positions not to overlap the CPU 13a. Therefore, the slide mechanisms 40 do not disturb heat transfer from the CPU 13a up to the graphite sheet 35 through the heat diffusion plate 45.

The cover device 14 includes the stand cover section 22 that functions as the stand of the portable information device 10. Here, the stand cover section 22 is placed on the side of the second chassis 12B, rather than on the side of the first chassis 12A in which the CPU 13a is installed. In other words, the cover device 14 is divided by the hinge device 24 into the fixed cover section 28 and the stand cover section 22 on the side of the second chassis 12B, and this disables thermal diffusion using the whole of the cover device 14. Therefore, in the embodiment, the stand cover section 22 is not provided on the side of the first chassis 12A in which the CPU 13a as the highest heating element is installed. Thus, the graphite sheet 35 can secure, in a position facing the CPU 13a, a large area from the first chassis 12A to part of the second chassis 12B, and high heat diffusion performance can be obtained.

Note that the present invention is not limited to the aforementioned embodiment, and changes can, of course, be made freely without departing from the scope of the present invention.

In the above, the foldable portable information device 10 is exemplified. However, when the portable information device is a tablet PC of a flat-plate type rather than of the folding type, the base cover section 20 of the cover device 14 may be formed by the fixed cover section 28 alone with the slide cover section 26 and the folding cover section 27 omitted. Further, when the stand function is unnecessary, the stand cover section 22 may be omitted from the cover device 14.

In the above, since the stand cover section 22 is so constructed that the bottom edge 22c thereof matches the bottom end face of the second chassis 12B extending in the X direction, the hinge shaft 30 is placed in a posture to be inclined in the XY directions so that the portable information device 10 takes a standing posture fallen a little in the standing position illustrated in FIG. 4. However, the hinge shaft 30 may be placed in parallel with the X direction or the Y direction depending on the installation position of the stand cover section 22.

In the above, the structure in which the cover device 14 is fixed integrally to the chassis 12A and 12B is exemplified. However, the cover device 14 may be a single part as a body completely separated from the portable information device 10. In this case, the cover device 14 may be detachably attached to the chassis 12A and 12B, for example, by using magnets or hooks. In this cover device 14 as a single part, the stand cover section 22 may be such that the first brackets 31A and 31B have only to be fixed to the base cover section 20.

In the above, the portable information device 10 foldable in half like a book is exemplified. However, in addition to the structure in which the same shaped chassis are folded in half, various structures can be exemplified as foldable portable information devices, such as a double-door structure in which two small-sized chassis are coupled to the right and left edges of a large-sized chassis in a foldable manner, an S-shaped folding structure in which two chassis different in folding direction from each other are coupled to the right and left edges of one chassis, and a J-shaped folding structure in which a small-sized chassis is coupled to one of the right and left edges of a large-sized chassis in a foldable manner, and the number of coupled chassis may be four or more. In this case, the cover device 14 may have such a structure as to cover the whole or part of the back surface of each chassis, and two or more chassis may be used simultaneously.

DESCRIPTION OF SYMBOLS 10 portable information device
12A first chassis
12B second chassis
13a CPU
14 cover device
16 display
20 base cover section
22 stand cover section
24 hinge device
26 slide cover section
27 folding cover section
28 fixed cover section
34A, 34B, 48 core material
36, 47 auxiliary sheet
37, 49 surface material
40 slide mechanism
46 back surface material

What is claimed is:

1. A portable information device comprising:
a chassis with a heating element housed inside; and
a cover device that covers a back surface of the chassis, wherein
the cover device comprises
a core material,
a graphite sheet laminated on a surface of the core material,
an auxiliary sheet laminated on a surface of the graphite sheet and softer than the core material, and
a surface material laminated on a surface of the auxiliary sheet to form a surface of the cover device and softer than the auxiliary sheet,
the core material and the auxiliary sheet are made of resin, and
a thickness of the auxiliary sheet is less than a thickness of the core material.

2. The portable information device according to claim 1, wherein the auxiliary sheet covers the entire surface of the graphite sheet.

3. The portable information device according to claim 1, wherein
the chassis comprises
a first chassis, and
a second chassis coupled adjacent to the first chassis to be rotatable relative to the first chassis,
the cover device comprises
a slide cover section provided to be movable relative to a back surface of the first chassis along a line-up direction of the first chassis and the second chassis,
a fixed cover section relatively fixed to a back surface of the second chassis, and
a folding cover section that connects between the slide cover section and the fixed cover section to be rotatable relative to each other,
the core material is provided in the slide cover section and the fixed cover section, but is not provided in the folding cover section, and
the graphite sheet, the auxiliary sheet, and the surface material extend over the slide cover section, the folding cover section, and the fixed cover section, and the folding cover section has a foldable folding region.

4. The portable information device according to claim 3, wherein
the fixed cover section is provided to cover part of the back surface of the second chassis, and
the cover device further comprises a stand cover section provided adjacent to the fixed cover section to cover the back surface of the second chassis, and provided to be rotatable relative to the fixed cover section.

5. The portable information device according to claim 4, wherein
the heating element includes a central processing unit, and
the central processing unit is installed in the first chassis.

6. The portable information device according to claim 5, further comprising
a slider device that couples the slide cover section to the first chassis to be movable relative to the first chassis along the line-up direction, wherein
the slider device comprises
a rail fixed to one of the slide cover section and the first chassis to extend along the line-up direction, and
a slider fixed to the other of the slide cover section and the first chassis, and coupled to the rail to be slidable along the line-up direction, and
the slider device is placed in a position not overlapping the central processing unit.

7. A cover device configured to cover a back surface of a chassis of a portable information device, comprising:
a core material;
a graphite sheet placed on a surface of the core material;
an auxiliary sheet laminated on a surface of the graphite sheet and softer than the core material; and
a surface material laminated on a surface of the auxiliary sheet to form a surface of the cover device and softer than the auxiliary sheet, wherein
the core material and the auxiliary sheet are made of resin, and
a thickness of the auxiliary sheet is less than a thickness of the core material.

8. The cover device according to claim 7, wherein the auxiliary sheet covers the entire surface of the graphite sheet.

9. The cover device according to claim 7, wherein
the cover device comprises
a first cover section,
a second cover section, and
a folding cover section that connects between the first cover section and the second cover section to be rotatable relative to each other,
the core material is provided in the first cover section and the second cover section, but is not provided in the folding cover section, and
the graphite sheet, the auxiliary sheet, and the surface material extend over the first cover section, the folding cover section, and the second cover section, and the folding cover section has a foldable folding region.

10. A portable information device comprising:
a chassis with a heating element housed inside; and
a cover device that covers a back surface of the chassis, wherein
the cover device comprises
a core material,
a graphite sheet laminated on a surface of the core material,
an auxiliary sheet laminated on a surface of the graphite sheet and softer than the core material, and
a surface material laminated on a surface of the auxiliary sheet to form a surface of the cover device and softer than the auxiliary sheet,
the chassis comprises
a first chassis, and
a second chassis coupled adjacent to the first chassis to be rotatable relative to the first chassis,
the cover device further comprises
a slide cover section provided to be movable relative to a back surface of the first chassis along a line-up direction of the first chassis and the second chassis,
a fixed cover section relatively fixed to a back surface of the second chassis, and
a folding cover section that connects between the slide cover section and the fixed cover section to be rotatable relative to each other,
the core material is provided in the slide cover section and the fixed cover section, but is not provided in the folding cover section,
the graphite sheet, the auxiliary sheet, and the surface material extend over the slide cover section, the folding cover section, and the fixed cover section, and the folding cover section has a foldable folding region,
the fixed cover section is provided to cover part of the back surface of the second chassis,
the cover device further comprises a stand cover section provided adjacent to the fixed cover section to cover the back surface of the second chassis, and provided to be rotatable relative to the fixed cover section,
the heating element includes a central processing unit,
the central processing unit is installed in the first chassis,
the portable information device further comprising
a slider device that couples the slide cover section to the first chassis to be movable relative to the first chassis along the line-up direction,
the slider device comprises
a rail fixed to one of the slide cover section and the first chassis to extend along the line-up direction, and
a slider fixed to the other of the slide cover section and the first chassis, and coupled to the rail to be slidable along the line-up direction, and
the slider device is placed in a position not overlapping the central processing unit.

11. The portable information device according to claim 10, wherein the auxiliary sheet covers the entire surface of the graphite sheet.

* * * * *